(12) United States Patent
Hollmann et al.

(10) Patent No.: US 9,480,958 B2
(45) Date of Patent: Nov. 1, 2016

(54) DEVICE AND METHOD FOR PRODUCING PHOSGENE

(71) Applicant: Bayer MaterialScience AG, Leverkusen (DE)

(72) Inventors: Ulrich Hollmann, Hamburg (DE); Friedhelm Steffens, Leverkusen (DE); Wolfgang Lorenz, Dormagen (DE); Thomas Runowski, Hilden (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/413,099

(22) PCT Filed: Jul. 9, 2013

(86) PCT No.: PCT/EP2013/064448
§ 371 (c)(1),
(2) Date: Jan. 6, 2015

(87) PCT Pub. No.: WO2014/009346
PCT Pub. Date: Jan. 16, 2014

(65) Prior Publication Data
US 2015/0165407 A1 Jun. 18, 2015

(30) Foreign Application Priority Data
Jul. 11, 2012 (EP) ..................................... 12175873

(51) Int. Cl.
*C01B 31/28* (2006.01)
*B01J 8/06* (2006.01)

(52) U.S. Cl.
CPC ............... *B01J 8/067* (2013.01); *C01B 31/28* (2013.01); *B01J 2208/00176* (2013.01); *B01J 2208/00221* (2013.01); *B01J 2208/021* (2013.01)

(58) Field of Classification Search
CPC ................................ B01J 8/067; C01B 31/28
USPC ...................................................... 422/202
See application file for complete search history.

(56) References Cited

U.S. PATENT DOCUMENTS

| 1,836,610 | A | * | 12/1931 | McMurdo | ............... | B60R 19/14 |
| | | | | | | 293/150 |
| 1,936,610 | A | | 11/1933 | Thomas et al. | | |
| 1,945,812 | A | | 2/1934 | Jaeger et al. | | |
| 3,434,807 | A | | 3/1969 | Ibing et al. | | |

(Continued)

FOREIGN PATENT DOCUMENTS

| WO | 2010076208 A1 | 7/2010 |
| WO | 2010076209 A1 | 7/2010 |
| WO | 2010103029 A1 | 9/2010 |

OTHER PUBLICATIONS

Ullmann's Encylopedia of Industrial Chemistry, 5th Ed, vol. A 19p 413f., VCH Verlagsgesellschaft mbH, Weinheim, 1991.

*Primary Examiner* — Walter D Griffin
*Assistant Examiner* — Huy-Tram Nguyen
(74) *Attorney, Agent, or Firm* — Donald R. Palladino

(57) ABSTRACT

The invention relates to a device (R) for producing phosgene by reacting chlorine and carbon monoxide in the presence of a fixed-bed catalyst, comprising a) a tube bundle, which is arranged inside a reactor jacket (4) and which has a plurality of reaction tubes (3), which are arranged substantially parallel to each other and which extend from a lower tube sheet (2) to an upper tube sheet (2), and b) a coolant space for a cooling fluid, which coolant space surrounds the reaction tubes (3) and is defined by the lower tube sheet (1), the upper tube sheet (2), and the reactor jacket (4), wherein the device is characterized in that the tube bundle is enclosed by an annular-space sheet (7), which defines an inner annular space (12) for the passage of the cooling fluid and which is arranged at a distance from both the lower tube sheet (1) and the upper tube sheet (2), wherein an outer annular space (13) for feeding liquid cooling fluid through is formed between the annular-space sheet (7) and the reactor jacket (4), which outer annular space is in fluid connection with the inner annular space (12). The invention further relates to a method for producing phosgene by means of such a device.

23 Claims, 2 Drawing Sheets

(56) References Cited

U.S. PATENT DOCUMENTS

| | | |
|---|---|---|
| 3,504,737 A | 4/1970 | Charcharos at at |
| 3,595,308 A | 7/1971 | Durdin |
| 4,657,741 A * | 4/1987 | Vogl ........................ B01J 8/067 165/159 |
| 7,988,927 B2 * | 8/2011 | Lehr ........................ B01J 8/067 165/104.21 |
| 2006/0047170 A1 | 3/2006 | Keggenhoff et al. |
| 2008/0269515 A1 | 10/2008 | Haas et al. |
| 2011/0319662 A1 | 12/2011 | Olbert et al. |
| 2013/0303783 A1 | 11/2013 | Pilia et al. |

* cited by examiner

DEVICE AND METHOD FOR PRODUCING PHOSGENE

CROSS REFERENCE TO RELATED APPLICATION

This application is a National Phase application to PCT/EP2013/064448, filed Jul. 9, 2013 and European Application No.: 12175873.4, filed Jul. 11, 2012.

FIELD

The invention relates to an apparatus for the production of phosgene by reaction of chlorine and carbon monoxide in the presence of a fixed-bed catalyst, comprising a tube bundle arranged inside a reactor shell and having a plurality of reaction tubes which are arranged substantially parallel to one another and extend from a bottom tube plate to a top tube plate, and a coolant chamber for a cooling fluid, which coolant chamber surrounds the reaction tubes and is delimited by the bottom tube plate, the top tube plate and the reactor shell. The invention relates additionally to a process for the production of phosgene by means of an above-mentioned apparatus.

BACKGROUND

The large-scale production of phosgene from CO and chlorine on activated carbon catalysts in a tube bundle reactor is known from the prior art (e.g. Ullmann's Encyclopedia of Industrial Chemistry, 5th Ed. Vol. A 19p 413f., VCH Verlagsgesellschaft mbH, Weinheim, 1991). Carbon monoxide in stoichiometric excess is in this case combined with chlorine and passed over a fixed-bed catalyst which, with a particle size in the range of from 3 to 5 mm, is located in tubes having an inside diameter of from 50 to 70 mm. The carbon monoxide excess is required to keep the content of free chlorine in the phosgene as low as possible, because chlorine can lead to undesirable reactions in the subsequent use of phosgene.

In order to cool the highly exothermic reaction with an enthalpy of formation of −107.6 kJ/mol, a cooling medium is guided around the catalyst tubes. The reaction between CO and chlorine starts on the catalyst at about 40 to 50° C., the temperature in the tubes rising to about 600° C. and falling to 40 to 240° C. again at the reactor outlet. A phosgene quality is thereby obtained that satisfies the requirements of isocyanate production, for example. High starting material purity is required especially for the carbon monoxide because, after it has been combined with chlorine, contents of methane and hydrogen resulting from the production can lead to a highly exothermic reaction with the formation of hydrogen chloride. The temperature rise can lead to a dangerous reaction between chlorine and the material of the apparatus, the so-called chlorine/iron fire.

Phosgene is used in many areas of chemistry, either as an auxiliary substance or as an intermediate. The largest area of use in terms of quantity is the production of diisocyanates as starting materials for polyurethane chemistry. Particular mention may be made here of the substances 2,4- and 2,6-tolylene diisocyanate, the isomers of diphenylmethane diisocyanate and hexamethylene diisocyanate. Owing to the dissociation equilibria, phosgene at 100° C. already contains about 50 ppm chlorine. For many areas of use, such as, for example, the production of isocyanates for polyurethane production, such a chlorine content already represents the upper limit of the specification, as disclosed in EP 0 134 506 B1.

As a result, many attempts have been made in the past to improve phosgene production in terms of product quality and economy. Accordingly, EP 2067742 A1 describes a process for the production of phosgene with reduced CO emission, or reduced CO losses, by a main combination, subsequent condensation of the phosgene and then combination of the residual gas with chlorine. A phosgene having a low carbon tetrachloride content is obtained by using CO having a low methane content, as described in EP 1135329 B1. WO 2010/103029 A1 provides a process with a control concept for minimising the CO excess.

An important aspect in the production of phosgene is the reliable and uniform dissipation of the heat of reaction. This is achieved by a cooling medium being guided around the reaction tubes by forced convection or being partially evaporated around the tubes by natural convection. EP 0 134 506 describes a process in which cooling with both forced and free convection can be used to generate steam. In one example, a reactor with 415 tubes arranged in parallel is mentioned.

EP 1 640 341 describes a process in which natural convection is used for cooling. Water is employed as the cooling medium. Because the cooling medium must not enter the reaction chamber for reasons of corrosion, the pressure in the cooling medium must in principle be lower than in the reaction chamber, because leakages cannot be ruled out. EP 1 640 341 additionally describes an apparatus which comprises inter alia a tube bundle reactor and a separator for the partially evaporated cooling medium. For the better cooling of large reactors, flow deflectors (baffle plates) are described. In this arrangement, however, it is in some cases perceived as a disadvantage that the number of tubes is limited in practice to about 3000 tubes.

WO 2010/076209 A1 describes a reactor which is equipped on the inside with baffle plates for a liquid heat exchanger medium. A more uniform heat dissipation is thereby said to be achieved in the case of large reactor diameters and increased throughputs, without increasing the amount of heat exchanger medium in circulation. The process is said to be suitable in particular for reactors having 1000 to 3500 contact tubes.

WO 2010/076208 A1 is concerned with a similar approach, that process being said to be suitable in particular for reactors having 2000 to 6000 contact tubes with direct cooling.

A further phosgene reactor with increased capacity is known from EP 1 485 195 A1. In that reactor, baffle plates for the cooling medium are arranged in such a manner that the cooling medium is guided in alternating sections perpendicularly to the tubes filled with catalyst. In addition, for reasons relating to the flow, no reaction tubes are arranged in some areas. Here too, the number of reaction tubes is generally between 1000 and 3500.

The necessity of producing ever greater capacities in an economical manner means that multiple lines are to be avoided and, instead, the flow rates through the single reactor are increased ever further. A problem that arises therein is the necessity to reliably cool each individual tube in a tube bundle reactor. Evaporative cooling by free convection, which is an efficient process, can be used for that purpose. However, adequate cooling by free convection requires each individual tube to be supplied with sufficient cooling medium over the entire heated length. In the case of starting materials that flow into the tube bundle reactor from the bottom, that is particularly challenging in the region immediately above the bottom tube plate, because a comparatively large amount of heat has to be dissipated there.

SUMMARY

The object of the present invention is to improve the cooling efficiency in an apparatus of the type mentioned at the beginning, especially for operation with free convection. It is likewise an aim of the invention to be able to use that efficient cooling also in comparatively large reactors having a large number of reaction tubes.

The object is achieved by an apparatus for the production of phosgene by reaction of chlorine and carbon monoxide in the presence of a fixed-bed catalyst, comprising
  a) a tube bundle arranged inside a reactor shell and having a plurality of reaction tubes which are arranged substantially parallel to one another and extend from a bottom tube plate to a top tube plate, and
  b) a coolant chamber for a cooling fluid, which coolant chamber surrounds the reaction tubes and is delimited by the bottom tube plate, the top tube plate and the reactor shell,
wherein the apparatus is characterised in that the tube bundle is enclosed by an annulus plate which defines an inner annulus for the passage of a cooling fluid and which is at a distance from both the bottom tube plate and the top tube plate, wherein there is formed between the annulus plate and the reactor shell an outer annulus for the passage of liquid cooling fluid, which outer annulus is in flow communication with the inner annulus.

The invention is based on the finding that efficient cooling of the reaction tubes in a tube bundle reactor can be achieved by enclosing the entire tube bundle with an annulus plate. An inner annulus is thereby defined, in which the heat of reaction is transferred from the reaction tubes to the liquid cooling fluid. As a result of being heated, the cooling fluid is conveyed upwards by convection. The flow is channelled by the annulus plate, so that the cooling fluid flows uniformly and rapidly around the reaction tubes. A portion of the cooling fluid may evaporate thereby.

On reaching the top edge of the annulus plate, the cooling fluid, which is still liquid, flows over this edge and back in the direction towards the bottom reactor plate again by way of the outer annulus, whereby the cooling fluid circuit is closed. The annulus plate likewise serves again to guide the cooling fluid, which flows over the outside of the annulus plate in the manner of a jacket, in a directed manner. The annulus plate additionally provides, in its mounted region, separation from the cooling fluid stream inside the reactor, so that turbulence caused by liquids flowing past immediately adjacent to one another, which could interfere with efficient convection, is avoided.

The apparatus according to the invention can consequently be operated with free convection, that is to say a pump is not essential for proper functioning, although one or more pumps can additionally be provided. In other words, the apparatus according to the invention functions even if the power supply fails, as a result of which the risk of accident is reduced significantly, which is a considerable advantage in terms of safety especially in relation to phosgene, which is highly toxic.

There can be used as the cooling fluid in principle any cooling fluid known to the person skilled in the art to be usable for phosgene production, for example water or also decalin.

The typical catalysts are used as the fixed-bed catalyst, such as, for example, the activated carbon catalysts known per se of appropriate particle sizes, for example from 3 to 5 mm.

There can be chosen for the annulus plate in principle any material which is otherwise also used for the construction of a phosgene reactor, for example the steel alloys conventionally used for that purpose. The thickness of the annulus plate is, for example, approximately from 0.5 to 1.0 cm. The annulus plate preferably has a cylindrical shape.

The distance of the annulus plate from the bottom reactor plate and from the top reactor plate can be varied within certain ranges. The distance from the bottom reactor plate is so chosen that on the one hand a sufficient flow speed of the cooling fluid is achieved to cool the reaction tubes sufficiently, especially in the highly stressed region immediately above the bottom reactor plate. To that end, the distance of the annulus plate from the bottom reactor plate should not be chosen to be too large, because the flow speed would be reduced too greatly as a result. However, too small a distance impairs the mass flow, so that the optimum distance depends ultimately on the dimensions of the reactor. It can, however, be determined by means of a few tests and corresponding calculations.

In a preferred form of the apparatus according to the invention, at least one down tube for the passage of liquid cooling fluid in the direction towards the bottom reactor plate is arranged within the tube bundle, in particular in the centre of the tube bundle. The down tube has, for example, an inside diameter of from 20 to 50 cm. The down tube is in particular so arranged that it protrudes beyond the top edge of the annulus plate. The precise arrangement takes account of the resulting overflow heights. This structural measure enables the proportion of the cooling fluid that is guided downwards by way of the down tube to be controlled, the majority of the cooling fluid generally flowing by way of the outer annulus. At its bottom edge, the down tube can be flush with the bottom edge of the annulus plate.

The apparatus according to the invention can in principle have any outer shape, for example a substantially circular cross-section. That is to say, the apparatus has a substantially cylindrical form.

The reaction tubes have, for example, typical diameters of from 30 to 70 mm. The apparatus according to the invention can in particular be provided with a large number of reaction tubes. Thus, even with more than 4000, preferably 9000 or even 12,000 tubes, efficient cooling of the reactor can still be achieved. Nevertheless, the invention is not limited to such large reactors but can likewise be constructed with a smaller number of tubes.

The apparatus according to the invention is suitable in particular for the production of phosgene, it being possible to use the reactor also for other processes in which heat of reaction is to be dissipated from a tube bundle reactor.

Preferably, the tube bundle in an apparatus according to the invention is divided into at least two tube bundle segments, in particular into symmetrical tube bundle segments, cooling fluid channels being provided between the tube bundle segments at least in sections, which cooling fluid channels have a width that corresponds at least to the diameter of a reaction tube and preferably extend starting from the annulus plate into the interior of the tube bundle. In that manner, cooling of the tube bundle can be further improved. In particular in combination with the annulus plate, the cooling fluid channels beneath the bottom edge of the annulus plate ensure that the cooling fluid can flow more easily in the direction towards the centre of the tube bundle, as a result of which the heat of reaction is dissipated more reliably especially in the critical region immediately above the bottom reactor plate.

The cooling fluid channels can extend to the centre of the tube bundle, or to the down tube, preferably at least two cooling fluid channels being configured in that manner. However, it can also be provided that the cooling fluid channels extend over a length of from ¼ to ¾ of the distance from the annulus plate to the centre of the tube bundle.

It is further preferred for at least one, preferably at least two, of the cooling fluid channels to extend to the centre of the tube bundle, the cross-section of those cooling fluid channels in particular narrowing towards the centre of the tube bundle, the narrowing preferably taking the form of a step. Particularly preferably, the cooling fluid channels extend alternately to the centre of the tube bundle. Particularly efficient cooling of the reaction tubes can be achieved thereby.

Although the reactants could in principle also be introduced into the apparatus according to the invention at the top, it is preferred in the present case for the inlet side of the reactants into the reaction tubes to be provided on the side of the bottom tube plate.

In a further preferred form of the apparatus according to the invention, at least one inlet opening for liquid cooling fluid and at least one outlet opening for gaseous cooling fluid are provided, the inlet opening in particular being arranged beneath the outlet opening.

As discussed above, the apparatus according to the invention can preferably be operated with free convection and by boiling operation. That means that a portion of the cooling fluid evaporates as it rises in the inner annulus, liquid and gaseous cooling fluid separating after passing the top edge of the annulus plate. In order to discharge the gaseous cooling fluid, it is possible in a further form of the apparatus according to the invention for the reactor shell to be widened in the top region to form a vapour belt. The widening can be achieved by an enlarged diameter relative to the reactor chamber located beneath. The outlet opening for gaseous cooling fluid is arranged at the vapour belt and is preferably provided in the top tube plate or on the upper side of the vapour belt. The outlet opening can additionally be connected to a condenser, in which the gaseous cooling fluid is condensed. The condenser can be liquid-cooled or air-cooled, which is preferred, because such cooling continues to function even in the case of a power failure. The condenser is advantageously connected by way of a return line to the inlet opening for liquid cooling fluid.

In a further form of the apparatus according to the invention, the vapour belt is in asymmetric form and/or is arranged asymmetrically to the annulus plate, the flow cross-section of the vapour belt being largest in particular in the region of the outlet opening. The vapour belt can have, for example, a circular cross-section and be displaced from the centre of the tube bundle to the side of the outlet opening. Alternatively or simultaneously, the vapour belt can also have a form other than a circular shape, such as, for example, an oval cross-section or a bulge in the region of the outlet opening. Ultimately, the only important factor here is that a radial flow with minimal speeds forms in the coolant chamber, as a result of which better separation of liquid and gaseous cooling fluid is achieved. The flow speed in the vapour belt then scarcely increases despite the increasing volume flow in the direction towards the outlet opening. In that manner, fewer droplets of the liquid cooling fluid are entrained, which brings about a reduction in the problem of corrosion in the top region of the reactor.

The apparatus according to the invention is accordingly so configured that the cooling fluid is able to rise from the bottom tube plate through the inner annulus in the direction towards the top tube plate, from where the cooling fluid can be guided by way of the outer annulus back to the bottom tube plate. As already mentioned above, the apparatus can have an associated cooling fluid circulation device, which in particular is so configured that it is able to convey the cooling fluid from the bottom tube plate through the inner annulus in the direction towards the top tube plate, from where the cooling fluid can be guided by way of the outer annulus back to the bottom tube plate.

The present invention relates additionally to a process for the production of phosgene by reaction of chlorine and carbon monoxide in the presence of a fixed-bed catalyst, using an apparatus comprising:
  a) a tube bundle arranged inside a reactor shell and having a plurality of reaction tubes which are arranged substantially parallel to one another and extend from a bottom tube plate to a top tube plate, and
  b) a coolant chamber for a cooling fluid, which coolant chamber surrounds the reaction tubes and is delimited by the bottom tube plate, the top tube plate and the reactor shell,
wherein the process is characterised in that the tube bundle is enclosed by an annulus plate which defines an inner annulus for the passage of a cooling fluid and which is at a distance from both the bottom tube plate and the top tube plate, wherein there is formed between the annulus plate and the reactor shell an outer annulus for the passage of liquid cooling fluid, which outer annulus is in flow communication with the inner annulus, and wherein the cooling fluid rises from the bottom tube plate through the inner annulus in the direction towards the top tube plate, from where the cooling fluid is guided by way of the outer annulus back to the bottom tube plate.

The process according to the invention is preferably operated as evaporative cooling, in which a portion of the cooling fluid evaporates by boiling.

In the case where water is used as the cooling medium, the penetration of the cooling medium into the reaction chamber must be avoided, even if the reaction tubes are not leak-tight. To that end, the pressure of the reaction chamber is kept above the pressure of the coolant chamber so flint, in the event of damage, phosgene enters the coolant chamber but water does not enter the product chamber. The coolant chamber is monitored for such a case of damage by means of suitable monitoring devices, as a result of which secondary damage is avoided.

In the process according to the invention, the CO and chlorine streams used are preferably employed with a molar excess of CO of from 2 to 20%, particularly preferably from 5 to 12%, in order to achieve a low chlorine content in the phosgene. There can be used as the gas mixer any commercial gas mixer, such as orifice mixers, static mixers or rotary mixers, although a special gas mixer may also be unnecessary with appropriate piping. The absolute pressure of the mixed gas in this case is preferably from 1.5 to 10 bar, particularly preferably from 2 to 5 bar.

By suitably choosing the coolant pressure, the coolant temperature, and consequently the product outlet temperature, is reliably maintained below 100° C. Cooling of the tube bundle reactor by way of the coolant chamber and the water circuit connected thereto by way of the inlet opening and the outlet opening preferably takes place with water at an absolute pressure of from 0.1 to 0.8 bar, particularly preferably from 0.15 to 0.5 bar, most particularly preferably from 0.2 to 0.3 bar. This results in boiling temperatures of the water of from 45 to 93.5° C. (at from 0.1 to 0.8 bar), from 55 to 80° C. (at from 0.15 to 0.5 bar) or from 60 to 70° C. (at from 0.2 to 0.3 bar). As a result, phosgene leaves the tube bundle reactor at a temperature below 100° C. The absolute pressure in the reaction tubes is preferably from 1.5 to 10 bar, particularly preferably from 2 to 5 bar.

If a chemically inert cooling medium is used, however, the pressure of the cooling medium can also be above the pressure in the reaction tubes. Highly pressurised steam can then be generated in a downstream condenser.

BRIEF DESCRIPTION OF DRAWINGS

The present invention will be described in greater detail below by means of FIGS. 1 and 2 and exemplary embodiments 1 and 2. In the figures.

DETAILED DESCRIPTION

Figure 1:
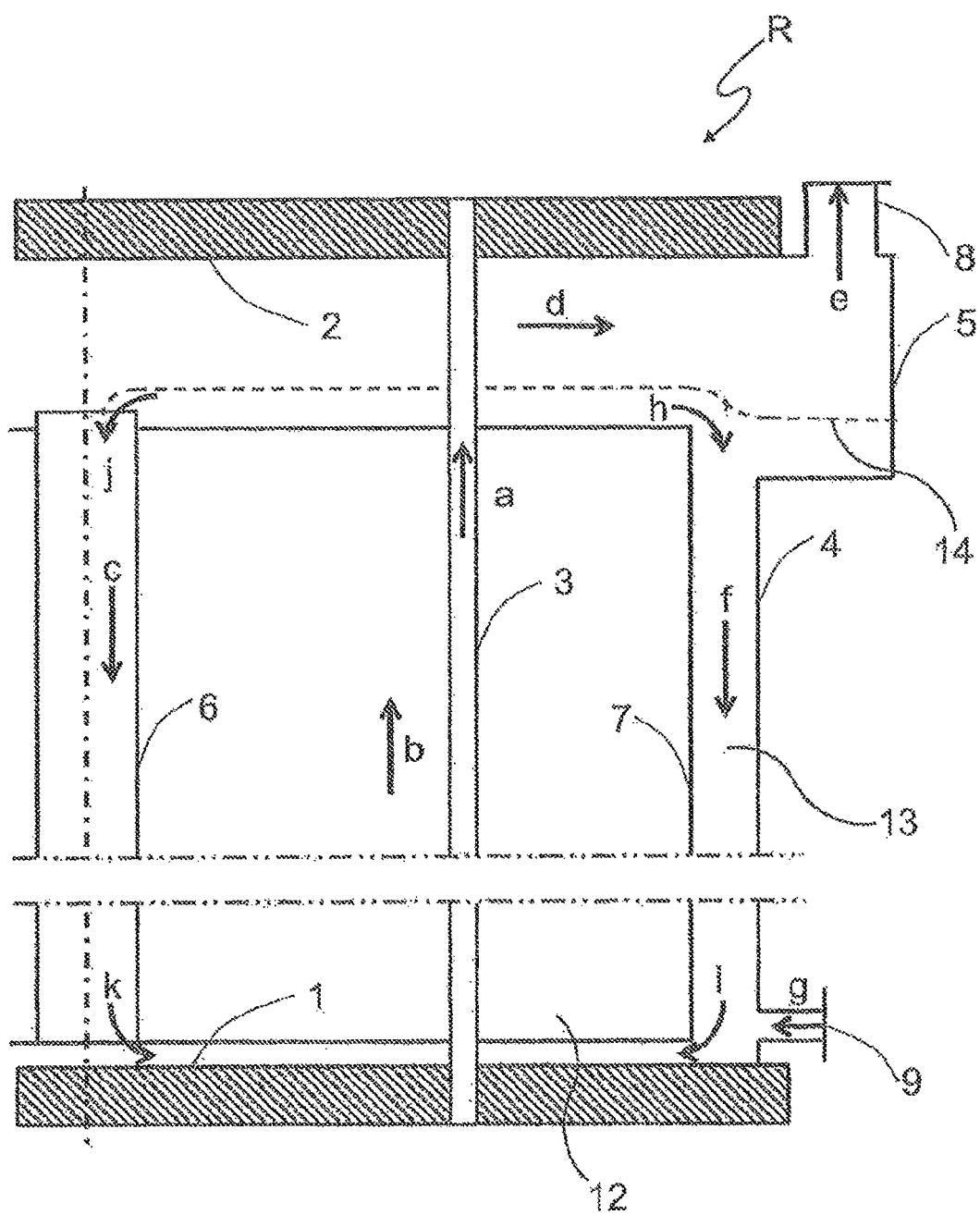
FIG. 1 shows a side sectional view of an apparatus according to the invention.

FIG. 1 shows an apparatus R according to the invention in the form of a tube bundle reactor for the production of phosgene by reaction of chlorine and carbon monoxide in the presence of a fixed-bed catalyst. The apparatus R comprises a reactor chamber which is delimited in the bottom region by a bottom reactor plate 1 and in the top region by a reactor plate 2 and a reactor shell 4. Within the reactor chamber there is arranged a plurality of reaction tubes 3 which are combined to form tube bundles and are filled with the fixed-bed catalyst in the form of a particulate activated carbon catalyst. For reasons of clarity in the representation of FIG. 1, only one reaction tube 3 is shown graphically.

The starting materials of the reaction, that is to say chlorine and carbon monoxide, are introduced into the reaction tube 3 at the bottom and flow upwards through the reaction tube 3 in a flow direction a, where the exothermic reaction to phosgene takes place. The tube bundle comprising the reaction tubes 3 is enclosed by an annulus plate 7, which defines an inner annulus 12 for the passage of a cooling fluid, for example water. The annulus plate 7 consists, for example, of a steel sheet and is at a distance from both the bottom tube plate 1 and the top tube plate 2. Furthermore, between the annulus plate 7 and the reactor shell 4 there is formed an outer annulus 13 for the passage of liquid cooling fluid, which outer annulus 13 is in flow communication with the inner annulus 12.

The distance of the annulus plate 7 from the bottom tube plate 1 is so chosen that, on the one hand, a sufficiently high cooling fluid flow speed above the bottom tube plate 1 is achieved without, on the other hand, reducing the mass flow of cooling fluid in the region too greatly.

In the centre of the tube bundle there is arranged a down tube 6 for the passage of liquid cooling fluid. The down tube 6 protrudes beyond the top edge of the annulus plate 7, it being possible for the cooling fluid stream through the down tube 6 and the outer annulus 13 to be divided in a targeted manner by the height of the protrusion. In the bottom region, the down tube 6 in the present case ends flush with the bottom edge of the annulus plate 7.

Beneath the top reactor plate 2 there is arranged a vapour belt 5, which is placed asymmetrically on the reactor shell 4. At the upper boundary of the vapour belt 5 there is provided an outlet opening 8 for gaseous cooling fluid, which outlet opening 8 is connected to a condenser, which is not shown in the present case. In the condenser, the gaseous cooling fluid is converted into the liquid form and fed back to the circuit by means of an annular line through an inlet opening 9 for liquid cooling fluid. The phase boundary between liquid and gaseous cooling fluid is indicated by the broken line 14.

Figure 2:
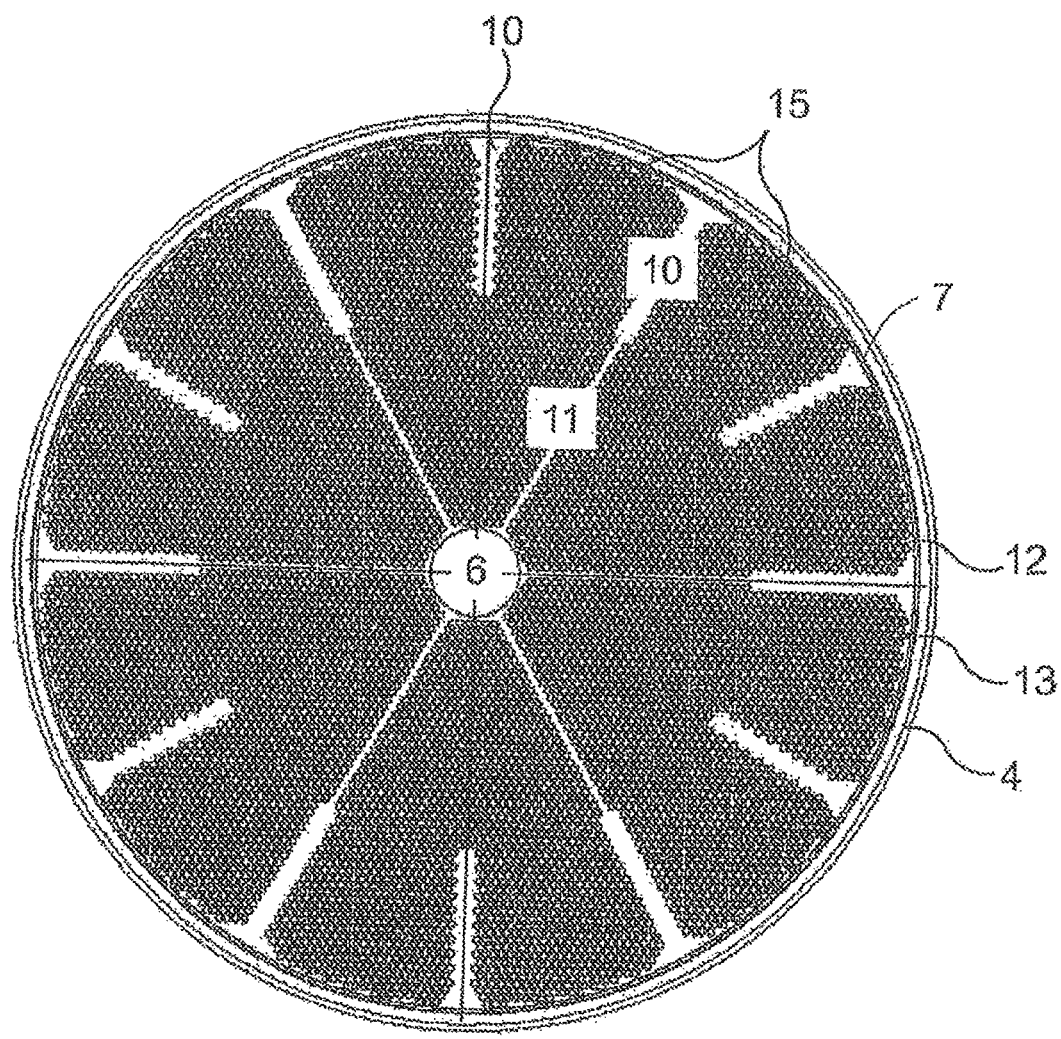
FIG. 2 shows a sectional view of the apparatus according to the invention of FIG. 1 from above.

FIG. 2 shows the tube bundle reactor R according to the invention in a sectional view from above. In this figure it will be seen that the tube bundle reactor R comprises a plurality of reaction tubes 3, which are arranged parallel to one another in the longitudinal extension of the reactor and are divided into individual tube bundle segments 15. The tube bundle segments 15 are very largely symmetrical segments of a circle, cooling fluid channels 10 being formed between the tube bundle segments 15. The cooling fluid channels 10 extend alternately to the middle of the reactor, that is to say to the down tube 6, the width of the cooling fluid channels 10 that extend to the down tube 6 narrowing in a step in the region 11. The cooling fluid channels 10 that do not extend to the down tube 6 have an extension, starting from the annulus plate 7, of approximately ⅓ of the total distance from the annulus plate 7 to the centre of the tube bundle.

During operation of the apparatus R shown in FIG. 1, the chlorine gas and the carbon monoxide flow through the reaction tube 3 in direction a, as has been described above, the reaction to phosgene being carried out as a result of contact with the fixed-bed catalyst with pronounced heat generation. The heat of reaction that forms there is transferred by way of the outside wall of the reaction tube 3 to the cooling fluid located inside the reactor chamber and surrounding the reaction tubes 3. Because the heat generation of the reaction to phosgene is most pronounced in the region immediately above the bottom tube plate 1, that is to say in the inlet region of the reaction tube 3, the cooling fluid is heated considerably in that region, as a result of which it is conveyed upwards in the inner annulus 12 in direction b by convection. A portion of the cooling fluid also evaporates thereupon.

On reaching the top edge of the annulus plate 7, the gaseous cooling fluid separates from the liquid cooling fluid in the vapour belt 5, which is placed asymmetrically on the reactor shell 4. The flow speed of the gaseous cooling fluid is kept low by the particular configuration of the vapour belt, so that virtually no droplets of liquid cooling fluid are entrained. The gaseous cooling fluid is passed by way of the outlet opening 8 into the condenser, where the gaseous cooling fluid is converted into the liquid form again and is fed to the circuit again by means of the annular line through the inlet opening 9 for liquid cooling fluid.

The cooling fluid channels 10 provided within the tube bundle have the effect that the cooling fluid fed back by way of the outer annulus 13 is more easily able to flow in the direction towards the centre of the tube bundle after passing the bottom edge of the annulus plate 7, as a result of which particularly effective cooling is achieved especially in the region immediately above the bottom tube plate 1.

EXAMPLE 1

Evaporation of Decalin for Cooling a Tube Bundle Reactor for Phosgene Production The tube bundle reactor has a diameter of 4 m with 8800 reaction tubes. The reaction tubes have a length of 4 m and an outside diameter of 30 mm. In total, a heat of reaction of 9100 kW must be dissipated. This is achieved by evaporating 111 t of decalin at 2.3 bar. The internal circulating mass flow is about 4300 t/h. In the attached condenser, 17 t/h of vapour are generated at 21 bar.

EXAMPLE 2

Evaporation of Water for Cooling a Tube Bundle Reactor for Phosgene Production

The tube bundle reactor has a diameter of 3.8 m with 1900 reaction tubes. The reaction tubes have a length of 4 m and an outside diameter of 60.3 mm. In total, a heat of reaction of 5500 kW must be dissipated. This is achieved by evaporating 18.4 t of water at 250 mbar. The internal circulating mass flow is about 2400 t/h.

LIST OF REFERENCE NUMERALS 1) bottom tube plate
2) top tube plate
3) reaction tube
4) reactor shell
5) vapour belt
6) down tube
7) annulus plate
8) outlet opening
9) inlet opening
10) cooling fluid channel
11) narrowing
12) inner annulus
13) outer annulus
14) phase boundary of the liquid cooling fluid
15) tube bundle segment
a) flow direction of the reactants and of the product
b-k) flow direction of the cooling fluid
R) apparatus

The invention claimed is:

1. An apparatus for the production of phosgene by reaction of chlorine and carbon monoxide in the presence of a fixed-bed catalyst, comprising
   a) a tube bundle arranged inside a reactor shell and having a plurality of reaction tubes which are arranged substantially parallel to one another and extend from a bottom tube plate to a top tube plate, and
   b) a coolant chamber for a cooling fluid, which coolant chamber surrounds the reaction tubes and is delimited by the bottom tube plate, the top tube plate and the reactor shell, wherein the tube bundle is enclosed by an annulus plate which defines an inner annulus for passage of the cooling fluid and which is at a distance from both the bottom tube plate and the top tube plate, wherein
   there is formed between the annulus plate and the reactor shell an outer annulus for passage of liquid cooling fluid, which outer annulus is in flow communication with the inner annulus,
   wherein at least one down tube for passage of liquid cooling fluid is arranged inside the tube bundle.

2. The apparatus according to claim 1, wherein the at least one down tube is arranged in the centre of the tube bundle.

3. The apparatus according to claim 1, wherein the at least one down tube protrudes beyond the top edge of the annulus plate.

4. The apparatus according to claim 1, wherein the apparatus has a substantially circular cross-section.

5. The apparatus according to claim 1, wherein an inlet side of the reactants into the reaction tubes is provided on the side of the bottom tube plate.

6. The apparatus according to claim 1, wherein at least one inlet opening for liquid cooling fluid and at least one outlet opening for gaseous cooling fluid are provided, the at least one inlet opening being arranged beneath the at least one outlet opening.

7. The apparatus according to claim 6, wherein the reactor shell is widened in the top region to form a vapour belt, and the outlet opening for gaseous cooling fluid is arranged at the vapour belt.

8. The apparatus according to claim 7, wherein the at least one outlet opening is provided in the top tube plate or on the upper side of the vapour belt and/or is connected to a condenser.

9. The apparatus according to claim 7, wherein the vapour belt is in asymmetric form and/or is arranged asymmetrically to the annulus plate, the flow cross-section of the vapour belt being largest in the region of the outlet opening.

10. The apparatus according to claim 8, wherein the condenser is connected by way of a return line to the inlet opening for liquid cooling fluid.

11. The apparatus according to claim 1, wherein the apparatus is so configured that the cooling fluid is able to rise from the bottom tube plate through the inner annulus in the direction towards the top tube plate, from where the cooling fluid can be guided by way of the outer annulus back to the bottom tube plate.

12. An apparatus for the production of phosgene by reaction of chlorine and carbon monoxide in the presence of a fixed-bed catalyst, comprising
   a) a tube bundle arranged inside a reactor shell and having a plurality of reaction tubes which are arranged substantially parallel to one another and extend from a bottom tube plate to a top tube plate, and
   b) a coolant chamber for a cooling fluid, which coolant chamber surrounds the reaction tubes and is delimited by the bottom tube plate, the top tube plate and the reactor shell, wherein the tube bundle is enclosed by an annulus plate which defines an inner annulus for passage of the cooling fluid and which is at a distance from both the bottom tube plate and the top tube plate, wherein there is formed between the annulus plate and the reactor shell an outer annulus for passage of liquid cooling fluid, which outer annulus is in flow communication with the inner annulus, and the tube bundle is divided into at least two tube bundle segments, cooling fluid channels being provided between the tube bundle segments at least in sections, which cooling fluid channels have a width that corresponds at least to the diameter of a reaction tube and extend from the annulus plate into the interior of the tube bundle.

13. The apparatus according to claim 12, wherein the tube bundle is divided into symmetrical tube bundle segments.

14. The apparatus according to claim 12, wherein the cooling fluid channels extend over a length of from ¼ to ¾ of the distance from the annulus plate to the centre of the tube bundle.

15. The apparatus according to claim 12, wherein at least one of the cooling fluid channels extends to the centre of the tube bundle, the cross-section of that cooling fluid channel narrowing to the centre of the tube bundle.

16. The apparatus according to claim 15, wherein the narrowing takes the form of a step.

17. The apparatus according to claim 15, wherein the cooling fluid channels extend alternately to the centre of the tube bundle.

18. The apparatus of claim 12, wherein at least one down tube for passage of liquid cooling fluid is arranged inside the tube bundle.

19. An apparatus for the production of phosgene by reaction of chlorine and carbon monoxide in the presence of a fixed-bed catalyst, comprising
   a) a tube bundle arranged inside a reactor shell and having a plurality of reaction tubes which are arranged substantially parallel to one another and extend from a bottom tube plate to a top tube plate, and
   b) a coolant chamber for a cooling fluid, which coolant chamber surrounds the reaction tubes and is delimited by the bottom tube plate, the top tube plate and the reactor shell, wherein the tube bundle is enclosed by an annulus plate which defines an inner annulus for passage of the cooling fluid and which is at a distance from both the bottom tube plate and the top tube plate, wherein there is formed between the annulus plate and the reactor shell an outer annulus for passage of liquid cooling fluid, which outer annulus is in flow communication with the inner annulus, and wherein the apparatus has an associated cooling fluid circulation device, which is so configured that it is able to convey the cooling fluid from the bottom tube plate through the inner annulus in the direction towards the top tube plate, from where the cooling fluid can be guided by way of the outer annulus back to the bottom tube plate.

20. The apparatus of claim 19, wherein at least one down tube for passage of liquid cooling fluid is arranged inside the tube bundle.

21. A process for the production of phosgene comprising reacting chlorine and carbon monoxide in the presence of a fixed-bed catalyst in the apparatus of claim 1.

22. A process for the production of phosgene comprising reacting chlorine and carbon monoxide in the presence of a fixed-bed catalyst in the apparatus of claim 12.

23. A process for the production of phosgene comprising reacting chlorine and carbon monoxide in the presence of a fixed-bed catalyst in the apparatus of claim 19.

* * * * *